Figure 1:
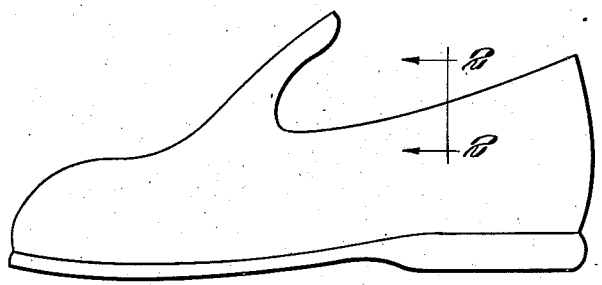

Jan. 4, 1949.  H. B. W. SNELLING  2,458,438
OVERSHOE WITH LINING FOR SHINING SHOES
Filed Sept. 13, 1946

Patented Jan. 4, 1949

2,458,438

UNITED STATES PATENT OFFICE 2,458,438

OVERSHOE WITH LINING FOR SHINING SHOES

Henry B. W. Snelling, Concord, Mass.

Application September 13, 1946, Serial No. 696,711

6 Claims. (Cl. 36—7.3)

As overshoes have been constructed heretofore their inner surfaces collect dust and dirt so that after they have been worn a few times they tend to destroy the shine on shoes over which they are worn.

Objects of the present invention are to provide an overshoe which has less tendency to collect dust and which, instead of tending to reduce the luster on a shoe over which it is worn, tends to increase the luster, and which, when wet on the inside, absorbs less moisture and retains less dirt and can therefore be dried more quickly and cleanly.

In one aspect the present invention involves the conception of an overshoe having a liquid-absorbent lining impregnated with waxy material so that the inner surface is water-repellent and dust repellent.

In another aspect the invention involves the discovery that in wearing an overshoe there is enough relative motion between the shoe and overshoe to polish the shoe if the overshoe has a liquid-absorbent lining impregnated with shoe-shining wax.

In still another aspect the invention involves joining the lining to the outer wall of the overshoe before the lining is impregnated with the aforesaid material, whereby the material does not interfere with good adherence between lining and covering. Preferably the impregnating solution is applied to the lining by spraying or swabbing although the solution may be poured into the overshoe or the entire overshoe may be dipped in the solution.

In the preferred construction the outer wall of the overshoe is rubber, the lining is knitted cotton having a substantial nap, and the rubber covering is vulcanized on the lining.

Preferred major constituents are the harder, higher-melting natural waxes such as carnauba, candelilla, montan, fiber, Chinese insect, cotton, sugar cane (refined) and ouricury wax, and/or the harder, higher-melting synthetic waxes such as those referred to in Commercial Waxes, by Bennet, published in 1944 by Chemical Publishing Co., namely I. G. waxes comprising glyceryl, glycol or polymerized ethylenic esters of acids derived from montan wax and other sources (p. 123); Halowax wax, a chlorinated naphthalene (p. 117); Acrawax, complex nitrogen derivatives of the higher fatty acids (p. 119); Opalwax, hydrogenated castor oil (p. 112); Durocer wax, M. P. 53° C., sp. gr. 0.88, acid No. 0, sap. No. 0, unsop. No. 100, flash point °C. 195–205 (p. 127); Albacer, a white hard wax having high luster, M. P. 95–97° C., and soluble in hot hydrocarbons (p. 128); Adheso, a light cream-colored wax with a hardness about that of beeswax, poor luster, M. P. 90–95° C., and softening point 47–50° C. (p. 128); Ozowax, a light brown wax, M. P. 76–85° C. and sp. gr. (80° C.) 0.893 (p. 132); Rezo, a hard brown wax, M. P. 107–112° C. and a flash point of 230° C. (p. 132); Stroba, a hard light cream-colored wax soluble in toluol and naphtha. It is also possible to use animal waxes such as stearic acid, also palmitic acid and similar higher fatty acids. Practically all of the above have melting-points higher than 60° C. The preferred solvent is chlorbenzene. To the composition may be added, in minor proportions, resins and gums, such as East India gum and/or paraffin, beeswax, japan wax ozokerite or ceresin and other relatively soft waxes. The preferred formula comprises 70 parts candelilla and 30 parts montan dissolved in hot chlorbenzene.

Figure 2:
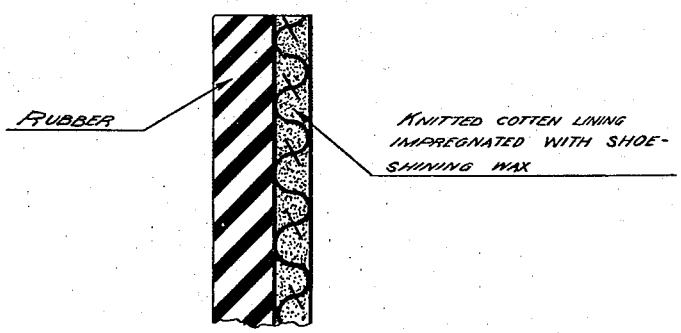

For the purpose of illustration a typical embodiment of the invention is shown in the accompanying drawing in which Fig. 1 is a perspective view of an overshoe; and Fig. 2 is an enlarged section on line 2—2 of Fig. 1.

It should be understood that the present disclosure is for the purpose of illustration only and that this invention includes all modifications and equivalents which fall within the scope of the appended claims.

I claim:

1. An overshoe comprising a napped lining impregnated with shoe-lining wax.

2. An overshoe according to claim 1 further characterized in that a major constituent of said wax has a melting point of at least 60° C.

3. An overshoe comprising an outer wall and a lining adhering to the inner surface of the outer wall, the lining being impregnated with shoe-shining wax.

4. An overshoe according to claim 3 further characterized in that a major constituent of said wax has a melting point of at least 60° C.

5. An overshoe comprising a fabric lining impregnated with shoe-shining wax.

6. An overshoe according to claim 5 further characterized in that a major constituent of said wax has a melting point of at least 60° C.

HENRY B. W. SNELLING.

REFERENCES CITED

The following references are of record in the file of this patent:

UNITED STATES PATENTS

| Number | Name | Date |
| --- | --- | --- |
| 1,223,297 | Stewart | Apr. 17, 1917 |
| 1,164,533 | Lagodimos | Dec. 14, 1915 |
| 2,130,794 | Enos | Sept. 20, 1938 |

FOREIGN PATENTS

| Number | Country | Date |
| --- | --- | --- |
| 153,177 | Switzerland | May 16, 1932 |